(12) United States Patent
Kasamatsu et al.

(10) Patent No.: US 6,704,808 B2
(45) Date of Patent: Mar. 9, 2004

(54) EXPANSION UNIT SETUP CONTROL METHOD THAT ALLOCATES PREDETERMINED I/O RESOURCES NOT CURRENTLY USED IN PROCESSING AND LATER DEALLOCATES SAID I/O RESOURCES UPON COMPLETION OF SETUP

(75) Inventors: Eitaroh Kasamatsu, Sagamihara (JP); Seiichi Kawano, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/781,282

(22) Filed: Feb. 13, 2001

(65) Prior Publication Data

US 2001/0016905 A1 Aug. 23, 2001

(51) Int. Cl.[7] .............................. G06F 1/24; G06F 9/00; G06F 3/00; G06F 13/00
(52) U.S. Cl. ...................... 710/2; 710/8; 710/9; 710/10; 710/18; 710/72; 710/103; 710/104; 713/100; 713/200; 713/201; 713/202; 713/300
(58) Field of Search ............................ 710/8, 9, 10, 18, 710/103, 104, 2, 72; 713/200, 201, 202, 100, 300

(56) References Cited

U.S. PATENT DOCUMENTS

| | | | | |
|---|---|---|---|---|
| 5,809,330 A | * | 9/1998 | Ninomiya | 710/9 |
| 5,911,042 A | * | 6/1999 | Kugue | 713/202 |
| 6,151,646 A | * | 11/2000 | Watts et al. | 710/72 |
| 6,170,020 B1 | * | 1/2001 | Blakeney et al. | 710/10 |
| 6,493,782 B1 | * | 12/2002 | Verdun et al. | 710/300 |

* cited by examiner

Primary Examiner—Jeffrey Gaffin
Assistant Examiner—Tammara Peyton
(74) Attorney, Agent, or Firm—Louis Herzberg; McGinn & Gibb, PLLC

(57) ABSTRACT

An expansion unit control method for use with an expansion control unit containing at least one device, includes allocating a predetermined input/output (I/O) resource, ensured not to be used in processing, to the at least one device as an I/O resource used for sending and receiving information, performing a predetermined process for the at least one device by sending and receiving information to and from the at least one device through the predetermined I/O resource, and deallocating the predetermined I/O resource allocated to the at least one device.

29 Claims, 8 Drawing Sheets

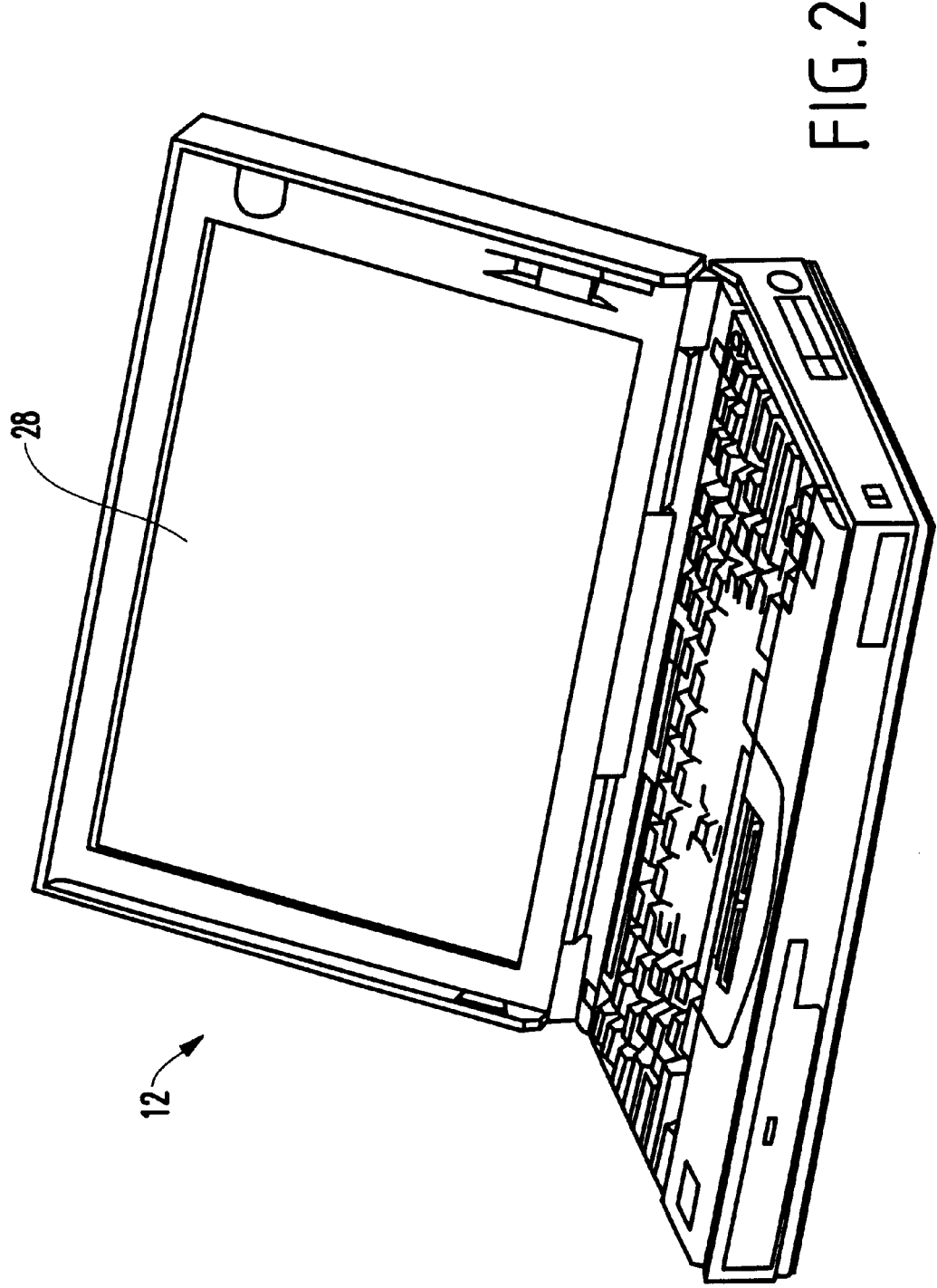

EXPANSION UNIT SETUP CONTROL METHOD THAT ALLOCATES PREDETERMINED I/O RESOURCES NOT CURRENTLY USED IN PROCESSING AND LATER DEALLOCATES SAID I/O RESOURCES UPON COMPLETION OF SETUP

BACKGROUND OF THE INVENTION

1. Field of the Invention

The present invention relates to a method, computer, recording medium, and transmission medium for controlling an expansion unit and, in particular, when a computer main unit is to be attached or detached from the expansion unit, to an expansion unit controlling method which performs a predetermined process for the device which is installed in the expansion unit, a computer to which the expansion unit controlling method can be applied, a recording medium on which a program for implementing the expansion unit controlling method by a computer, and a transmission medium for transmitting the program for implementing the expansion unit controlling method by a computer.

2. Description of the Related Art

There are various types of peripheral device that can be installed in (or connected to) a personal computer (PC), including, for example, a hard disk drive (HDD), a floppy disk drive (FDD), a CD-ROM drive, and a DVD (Digital Video Disc or Digital Versatile Disc) drive. On the other hand, as notebook PCs are becoming increasingly smaller and lighter, the number and types of devices that can be installed in the PCs are becoming limited.

Therefore, an expansion unit (called a "docking station", or "port replicator"), that can be easily attached and detached to and from the main unit of the notebook PC and to which various devices can be attached selectively, is provided for many notebook PCs. By installing a desired device that is not preinstalled in the main unit of the PC and connecting the PC main unit with the expansion unit, various capabilities can be implemented by using the desired device. When the PC is moved (e.g., made portable), the main unit of the PC can be detached from the expansion unit to avoid the inconvenience during the PC's movement.

Recent operating systems (OS) and Basic Input/Output Systems (BIOS) (i.e., a program for controlling input/output operations of hardware such as a keyboard and floppy disk drive) typically support "Plug and Play" (PnP) capability (i.e., the capability of a computer to automatically recognize a newly connected device and perform auto-configuration such as processes for allocating system resources thereto and loading the driver associated therewith) and also the expansion unit can be easily attached/detached to/from the main unit of the PC whether power to the main unit of the PC is off or the OS is running.

When the PC main unit is attached to the expansion unit during a power-off state of the PC main unit, the PnP capability is accomplished by a BIOS (in particular, Power-On Self Test (POST) routines in the BIOS) and the OS. When the PC main unit is attached to the expansion unit while the OS is running on the PC [(in detail, when the PC main unit is attached to the expansion unit during an energy-saving mode such as a suspend mode or the like. What is called "warm docking," or while the PC main unit is not in an energy-saving mode or a quasi-energy-saving mode (e.g., stand-by mode), (so-called "hot docking"))], PnP capability is implemented by the OS (i.e., the BIOS detects the connection of the PC main unit with the expansion unit and interconnects both of their buses).

To prevent information resources from being compromised by unauthorized use of a PC, recently, many devices, such as a HDD as well as the main unit of the PC can be password-protected. Therefore, the use of a device installed in an expansion unit may be locked with a password when the expansion unit is attached to the main unit of the PC.

Auto-configuration is performed by an OS when the expansion unit is connected to the PC main unit on which the OS is running. However, none of the existing OSs support the capability of prompting a user to enter a password, and using the entered password to unlock a locked device installed in the expansion unit attached to the PC main unit. Therefore, if a device locked with a password is installed in the expansion unit attached to the PC main unit, then the password cannot be cleared, and the device cannot be used.

Japanese Published Unexamined Patent Application No. 9-237229 discloses a technique in which a system BIOS detects the presence or absence of an access-locked storage device in an expansion unit when the expansion unit is connected to the main unit of a PC. If it detects the presence of an access-locked storage device, then the system BIOS issues an APM event to cause an OS to activate a high-level driver and the high-level driver prompts the user to enter a password to release the access lock.

However, the technique described in the above-mentioned application requires a special BIOS and driver having the capability of releasing the password lock so that the system BIOS and the high-level driver cooperate together to unlock a device locked with a password. However, whereas the BIOS is stored in ROM (e.g., a flash ROM), the driver is stored in the HDD. Therefore, the special driver having the capability of clearing the password must be reinstalled when, for example, the HDD is formatted and the OS is re-installed. If the user forgets to re-install the special driver or unintentionally uninstalls it, then the operation of clearing the password cannot work. Therefore, it is desirable that the BIOS itself should implement the capability of clearing the password.

By the same token, for the "hot-docking" or "warm-docking" of the PC main unit with the expansion unit, when a physical connection between the PC main unit and the expansion unit is detected, a BIOS is first activated. The activated BIOS connects the bus of the PC main unit with the bus of the expansion unit and performs other required processes, and then notifies an OS of the connection between the PC main unit and the expansion unit. The notified OS performs a sequence of processes such as the allocation of system resources such as I/O space, the loading of an appropriate device driver and other processes to the device installed in the expansion unit. Once control is passed to the OS, there is no opportunity for the BIOS to be re-activated for hot-docking or warm-docking.

Therefore, for the BIOS itself to perform processes such as unlocking a locked device installed in an expansion unit during hot-docking or warm-docking of the PC main unit with an expansion unit, the BIOS itself should allocate I/O space to the device installed in the expansion unit, clear a password, and perform other processes on behalf of the OS before passing control to the OS.

However, it is difficult for the BIOS to detect proper I/O space allocatable to the device installed in the expansion unit during hot-docking or warm-docking. Because I/O space allocation to devices preinstalled in the PC when the PC is powered on is performed by POST, which is part of the BIOS, the BIOS recognizes the addresses of I/O space that are initially allocated to the devices during the power-on of the PC. However, if the I/O space allocation is changed by the OS because of a connection of a new device (e.g., a PC card), then the BIOS is not notified of the change. Therefore, it is difficult for the BIOS to recognize available I/O space during hot-docking or warm-docking.

To solve the above-mentioned problem, the BIOS may look for currently unused I/O space and allocate I/O space identified as unused space to devices in the expansion unit during the hot-docking or warm-docking of the PC main unit with the expansion unit. However, the process is lengthy because searching for unused I/O space is a highly complicated process. In addition, memory cannot be effectively used because an enormous number of instruction codes must be stored in the memory in preparation for the hot-docking or warm-docking of the PC main unit with the expansion unit, even though when and whether it will occur is unknown.

SUMMARY OF THE INVENTION

In view of the foregoing and other problems, disadvantages, and drawbacks of the conventional methods and structures, an object of the present invention is to provide a method, computer, recording medium, and transmission medium for controlling an expansion unit that allow a predetermined process to be performed simply for an expansion unit attached to or to be detached from the main unit of a computer on which an operating system is running.

The expansion unit control method according to the present invention allocates a predetermined I/O resource ensured not to be used in processing (i.e., during the execution of a process according to the present invention) to a device installed in an expansion unit as an I/O resource for sending and receiving information when it is detected that a computer main unit is physically attached to the expansion unit, or it is notified that the computer main unit is to be detached from the expansion unit, while an operating system is running on the computer main unit to which the expansion unit containing one or more devices can be attached.

The predetermined I/O resource ensured not to be used in the processing may be, for example, I/O space allocated to a device (e.g., a gate array) which is connected to an Industry Standard Architecture (ISA) bus of the computer main unit and is specific to the computer main unit. I/O space allocated to the device specific to the computer main unit can be easily ensured not to be used during the process because only limited elements access the device specific to the computer main unit (e.g., it can be ensured by simple means for masking an interruption in the processing).

As mentioned above, I/O space allocated to devices (ISA devices) connected to the ISA bus is fixed. If the fixed I/O space allocated to the devices includes I/O space that will never be used for a device installed on the OS (e.g., if an ISA IDE controller is connected to the ISA bus but only one bay (e.g., a bay for a primary channel) is physically provided, and when no bay for a secondary channel exists, I/O space allocated to the secondary channel will never be used on the OS), the I/O space may be used alternatively as the predetermined I/O space.

As described above, information can be sent and received to and from a device installed in the expansion unit through a predetermined I/O resource by allocating the predetermined I/O resource to the device, even if the device is a PCI device connected to a Peripheral Component Interconnect (PCI) bus. Therefore, according to the present invention, the predetermined process is performed for the device by exchanging information with the device installed in the expansion unit through the predetermined I/O resource. After the completion of the predetermined process, the predetermined I/O resource allocated to the device installed in the expansion unit is deallocated.

The predetermined process may be, for example, a process for releasing a lock by sending a password to a device which is installed in an expansion unit physically attached to the computer main unit and the use of which is locked by the password. The password for releasing the lock in this process may be obtained by prompting a user to enter the password.

The predetermined process may also be a process for programming a data transfer rate, programming a timer value for switching a device to a sleep status after the device is idle for a certain period, or deactivating a device installed in the expansion unit to be detached from the computer main unit.

As described above, according to the present invention, a predetermined process is performed by using a predetermined I/O resource ensured not to be used in processing. Therefore, highly complicated processes, such as a process for finding an I/O resource that is not allocated to other devices, is not required, and the predetermined process can be performed easily for an expansion unit that is attached to a computer main unit or is to be detached from the computer main unit while an operating system is running on the computer main unit.

Because the expansion unit control method according to the present invention can be implemented by a BIOS by itself, which is installed in the computer main unit, the predetermined process can be performed surely for a device installed in the expansion unit without depending on a special driver, which, for example, can fail to be re-installed after the reformatting of a hard disk drive or can be uninstalled.

If a device installed in the expansion unit is an IDE device conforming to the Integrated Drive Electronics (IDE) standard, then an AT Attachment (ATA) command can be used as the information exchanged with the device to perform the predetermined process. The size of a group of registers provided correspondingly to the IDE device for exchanging information is 20 bytes for each channel. If the size of I/O space that can be allocated as a predetermined I/O resource is smaller than 20 bytes (e.g., 8 bytes), it is difficult to allocate I/O space to all of the registers in the group of registers.

Therefore, preferably, if the size of the I/O space as the predetermined I/O resource is smaller than the size of a group of registers for sending and receiving information that is provided in the expansion unit correspondingly to a device installed in the expansion unit, then the I/O space is allocated to a command accepting register in the group of registers to perform the predetermined process in PIO mode (i.e., all the registers in the group are used if a DMA/PCI bus master transfer mode is used), or the I/O space is allocated to the command accepting register in the group of registers and an ATA command is sent to it. Then, the I/O space is allocated to a status notification register in the group of registers, and it is determined that the device received the ATA command to perform the predetermined process. Thus, the I/O space smaller than the size of the group of registers can be used to exchange information with the IDE device.

The computer according to the present invention, as with the expansion unit control method of the present invention, allows a predetermined process to be performed easily for an expansion unit that is attached to a computer main unit or is to be detached from the computer main unit while an operating system is running on the computer main unit, because allocation means allocates a predetermined I/O resource ensured not to be used in processing to a device installed in the expansion unit when the computer main unit is physically attached to an expansion unit, or the computer main unit is to be detached from the expansion unit while an operating system is running on the computer main unit to which the expansion unit containing one or more device can be attached. Further, processing means performs a predetermined process for the device by sending and receiving information to and from the device through the predetermined I/O resource. Additionally, deallocation means deallocates the predetermined I/O resource allocated to the device.

The recording medium according to the present invention contains a program for implementing by a computer a process (i.e., a method) for the expansion unit control method of the present invention, which includes allocating a predetermined I/O resource ensured not to be used in processing to a device installed in the expansion unit when the computer main unit is physically attached to an expansion unit, or the computer main unit is to be detached from the expansion unit while an operating system is running on the computer main unit to which the expansion unit containing one or more device can be attached, performing a predetermined process for the device by sending and receiving information to and from the device through the predetermined I/O resource, and deallocating the predetermined I/O resource allocated to the device.

Therefore, by reading the program contained in the recording medium, a predetermined process can be performed easily for an expansion unit that is attached to a computer main unit, or is to be detached from the computer main unit while an operating system is running on the computer main unit, as with the expansion unit control method of the present invention.

The transmission medium according to the present invention transmits a program for implementing, by a computer, a process (i.e., a method) for the expansion unit control method of the present invention, which includes allocating a predetermined I/O resource ensured not to be used in processing to a device installed in the expansion unit when the computer main unit is physically attached to an expansion unit, or the computer main unit is to be detached from the expansion unit while an operating system is running on the computer main unit to which the expansion unit containing one or more device can be attached, performing a predetermined process for the device by sending and receiving information to and from the device through the predetermined I/O resource, and deallocating the predetermined I/O resource allocated to the device.

Therefore, a predetermined process can be performed easily for an expansion unit that is attached to a computer main unit, or is to be detached from the computer main unit while an operating system is running on the computer main unit, as with the expansion unit control method of the present invention, by the computer temporarily storing the program transmitted by the transmission medium in storage means, and then reading the program from the storage means to execute the program.

The present disclosure relates to subject matter contained in Japanese Patent Application No. 2000-36864, filed Feb. 15, 2000, which is expressly incorporated herein by reference in its entirety.

BRIEF DESCRIPTION OF THE DRAWINGS

The foregoing and other purposes, aspects and advantages will be better understood from the following detailed description of a preferred embodiment of the invention with reference to the drawings, in which:

FIG. 2 shows a perspective view of the exterior of a notebook personal computer (PC) 12;

DETAILED DESCRIPTION OF PREFERRED EMBODIMENTS OF THE INVENTION

Figure 1:
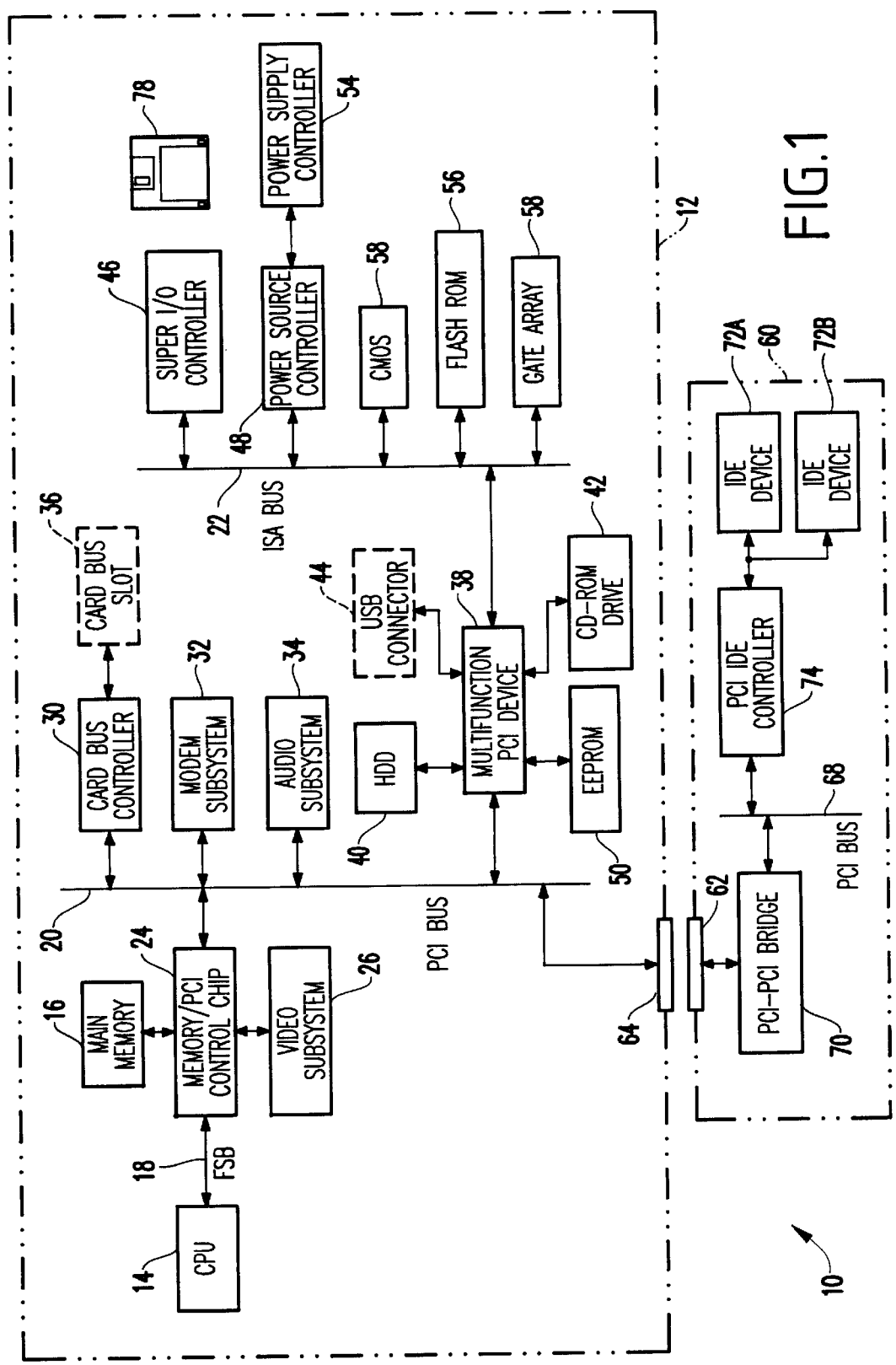
FIG. 1 shows a block diagram of an outline configuration of a computer system 10 according to the present invention.

Referring now to the drawings, and more particularly to FIGS. 1–8C, there are shown preferred embodiments of the method and structures according to the present invention.

One example of the embodiment of the present invention will be described below with reference to the accompanying drawings. FIG. 1 schematically shows a hardware configuration of a computer system 10 including of a personal computer (PC) suitable for implementing the present invention. One example of the PC implementing the present invention may be a notebook PC 12 (e.g., see FIG. 1) conforming to the PC Open Architecture Developer's Group (OADG) specification and running an operating system such as Windows 98® or Windows 2000® from Microsoft Corporation or OS/2 from IBM Corporation. The components of the computer system 10 will be described below.

A central processing unit (CPU) 14, which is the "brain" of the entire computer system 10, executes programs under the control of an OS. The CPU 14 may be Pentium®, MMX Technology Pentium®, or Pentium Pro®, which are CPU chips from Intel Corporation, PowerPC® from IBM Corporation, or other CPUs from AMD or other manufacturers. The CPU 14 comprises a Level 2 (L2) cache, which is a fast operating memory cache temporarily storing limited codes and data that are frequently accessed to reduce the total access time to the main memory 16. The L2 cache is typically formed by a static RAM (SRAM) chip.

The CPU 14 is interconnected with hardware components, which will be described below, through three levels of buses (e.g., a FrontSide (FS) bus 18, which is a processor bus directly coupled to an external pin of the CPU 14 itself, a Peripheral Component Interconnect (PCI) bus 20, which is a fast I/O-device bus, and an Industry Standard Architecture (ISA) bus 22, which is a low-speed I/O-device bus).

The FS bus 18 and PCI bus 20 are coupled through a bridge circuit (host-PCI bridge), commonly known as a "memory/PCI control chip" 24. The memory/PCI chip 24 in the present embodiment contains a memory controller for controlling access operations to the main memory 16 and a data buffer for accommodating a difference between data transfer rate of the FS bus 18 and that of the PCI bus 20, and may be 440EX or 440GX from Intel Corporation or other bridges can be used.

The main memory 16 preferably is a writable memory used as an area into which an execution program of the CPU 14 is loaded or a working area in which data processed by the execution program is written. Typically, the main memory 16 is formed by a plurality of Dynamic RAM (DRAM) chips. In recent years, the DRAM has been evolved into fast page-mode DRAM, EDO DRAM, synchronous DRAM (SDRAM), burst EDO DRAM, and RDRAM.

The term "execution programs" as used herein include an operating system such as Windows98®, various device drivers for manipulating hardware such as peripheral devices, application programs for specific tasks, and firmware including BIOSs stored in flash ROM 56 (which will be described below).

The PCI bus 20 is preferably a bus that allows for relatively fast data transfer rate (e.g., a bus having a width of 32/64 bits, the maximum operating frequency of 33/66/100 MHz, and the maximum data transfer rate of 132/264 MBps) and coupled to which are PCI devices such as a card bus controller 30 that operate at a relatively high speed. The PCI architecture is an architecture introduced by Intel Corporation and provides the "Plug and Play (PnP)" capability.

A video subsystem 26 is a subsystem for providing functions relating to video. It comprises a video controller which processes an image generation instruction provided by the CPU 14, writes the processed image generation information into video memory (VRAM), and reads image generation information from the VRAM to output it to a liquid crystal display (LCD) 28 (shown in FIG. 2) as image data. The video controller can convert a digital video signal into an analog video signal with a digital-analog converter (DAC) associated with it. The analog video signal is output to a CRT port (not shown) over a signal line.

Also connected to the PCI bus 20 are a card bus controller 30, a modem subsystem 32, and an audio subsystem 34. The card bus controller 30 is a special controller for directly coupling a bus signal on the PCI bus 20 to an interface connector (card bus) of a PCI card bus slot 36. The card bus slot 36 is provided, for example, on a wall of the main body of the PC 12 and holds a PC card (not shown) conforming to a specification (e.g., "PC Card standard 95") developed by the Personal Computer Memory Association (PCMCIA)/Japan Electronic Industry Development Association (JEIDA).

Attached to the modem subsystem 32 is, for example a communication line such as a LAN or a telephone. The computer system 10 can be connected to the Internet (or intranets) via these communication lines.

The PCI bus 20 and the ISA bus 22 are interconnected through a multifunctional PCI device 38. The multifunctional PCI device 38 provides a bridge function between the PCI bus 20 and the ISA bus 22, a Direct Memory Access (DMA) controller function, a Programmable Interrupt Controller (PIC) function, a Programmable Interval Timer (PIT) function, an Integrated Drive Electronics (IDE) interface function, a Universal Serial Bus (USB) function, and a System Management Bus (SMB) interface function, and may be a PIIX4 device from Intel Corporation, for example.

The DMA controller function allows for data transfer between a peripheral device (e.g., a floppy disk drive) and the main memory 16 without involvement of the CPU 14. The PIC function causes a predetermined program (e.g., an interrupt handler) to be executed in response to an interrupt request (IRQ) from a peripheral device. The PIT function generates a timer signal at predetermined intervals which are programmable.

The IDE hard disk drive (HDD) 40 is connected to an IDE interface implemented by the IDE interface function, and an IDE CD-ROM drive 42 is also connected to the multifunctional PCI device 38 through an AT Attachment Packet Interface (ATAPI). Instead of the IDE CD-ROM drive 42, other types of IDE devices, such as a DVD (Digital Video Disc or Digital Versatile Disc) drive, may be connected to the IDE interface. External storage devices such as the HDD 40 and the CD-ROM drive 42 are held in a space called a "media bay" or a "device bay" in the main unit of the PC 12, for example. These standard external storage devices may be installed exclusively and exchangeably with other devices such as a floppy disk drive or a battery pack.

A USB port is provided in the multifunctional PCI device 38. The USB port is connected to a USB connector 44 provided on a wall of the main unit of the PC. The USB supports a capability allowing a new peripheral device (USB device) to be connected to or disconnected from an active system (i.e., a "hot plugging" function) and a function for automatically recognizing a newly attached peripheral device and reconfiguring the system (i.e., "plug and play" function). Up to 63 USB devices can be daisy-chained to a single USB port. Examples of USB devices include a keyboard, mouse, joystick, scanner, printer, modem, display monitor, tablet, and the like.

EEPROM 50 is also connected to the multifunctional PCI device 38 through an SM bus. The EEPROM 50 holds information such as a password registered by a user, a supervisor password, and a product serial number, is nonvolatile, and its content is electronically rewritable.

The ISA bus 22 provides a data transfer rate slower (e.g., a bus width of 16 bits and the maximum data transfer rate of 4 MBps) than that of the PCI bus 20, and is used for connecting a Super I/O controller 46, power source controller 48, flash ROM 56 formed by a ROM such as EEPROM, CMOS 58, and peripheral devices such as real-time clock (RTC) and a keyboard/mouse controller (not shown) that operate at a relatively low speed.

An I/O port is provided in the Super I/O controller 46. The Super I/O controller 46 is a peripheral controller that controls a floppy disk drive (FDD) 78, the input/output of parallel data through a parallel port, and the input/output of serial data through a serial port.

The power source controller 48 mainly performs power management and thermal management of the computer system 10 and may be formed by a single chip microcomputer including a micro processing unit (MPU), RAM, ROM, and a timer. The ROM stores programs and a look-up table required for the power management and thermal management. A power supply controller 54 is connected to the power source controller 48. The power supply controller 54 contains a battery charger for recharging a battery and a DC—DC converter for generating DC voltages of 5 V or 3.3 V, etc., used in the computer system 10, and controls power supply under the power source controller 48.

The flash ROM 56 holds BIOSs and firmware programs such as bootstrap codes, is nonvolatile, and its content is electrically rewritable. The CMOS 58 includes of volatile semiconductor memory connected to a back-up power source and acts as non-volatile, fast storage means. A gate array 58 is connected to the ISA bus 22. The gate array 58 implements capabilities (e.g., the process of a signal output from a sensor, which is not shown, for detecting the attachment/detachment of PC 12 to/from a docking station 60, which will be described later) specific to the PC 12.

Figure 3A:
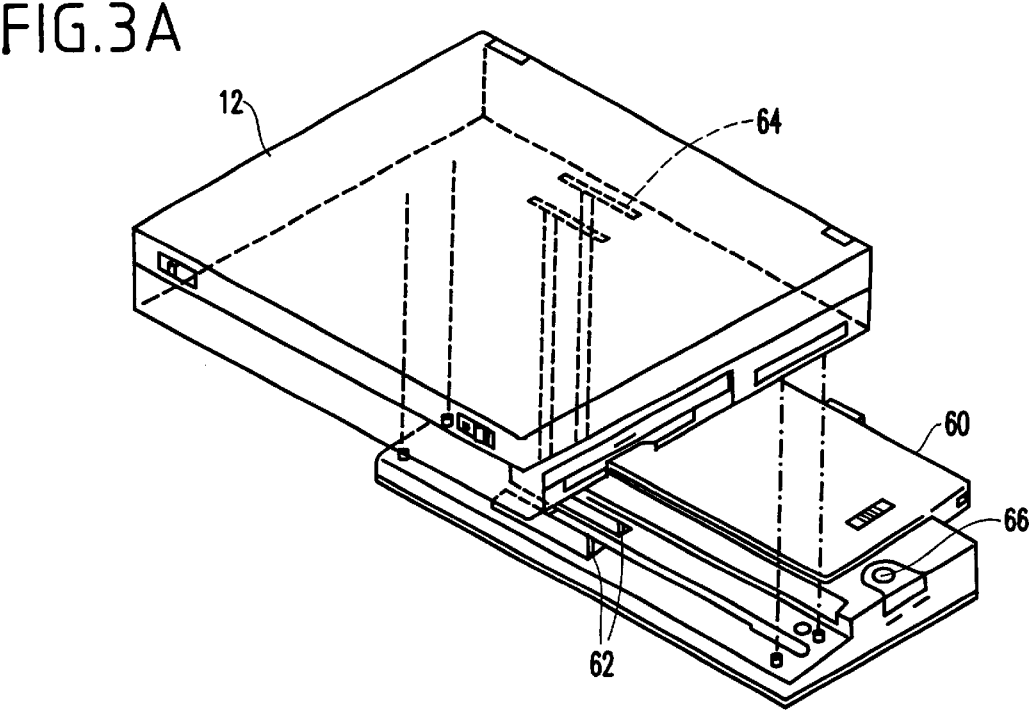
FIG. 3A shows a perspective view for explaining the attachment of the PC 12 to a docking station 60 and FIG. 3B shows how the PC 12 is attached to the docking station 60.
Figure 3B:
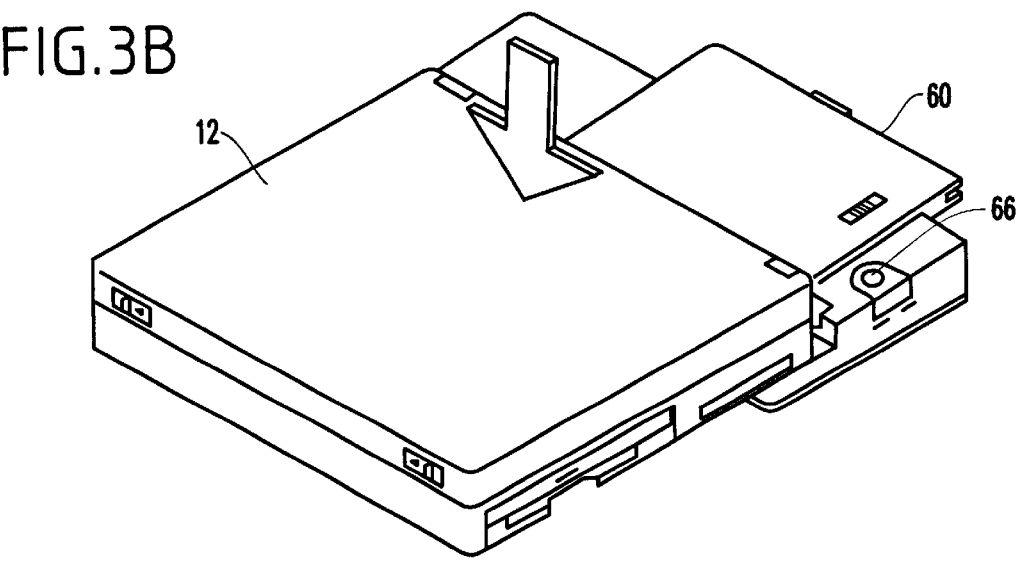

The docking station 60 is configured to be attachable/detachable to/from the PC 12. As shown in FIG. 3A, to attach the PC 12 to the docking station 60, the PC 12 is positioned over the docking station 60 ready for holding the PC 12 thereon so that projections provided on the upper surface of the docking station 60 are inserted into openings (not shown) provided in the bottom of the PC 12. Then, the PC 12 is pressed against the docking station 60 from above.

A connector 62 is provided on the upper surface of the docking station 60. A connector 64 (e.g., see FIG. 1), which fits into the connector 62, is provided on the bottom of the PC 12. The connector 62 is physically connected with the connector 64 when the PC 12 is attached to the docking station 60 (e.g., see FIG. 3B). A release latch 66 is provided on the docking station 60. When the latch 66 is depressed, the PC 12 is removed from the docking station 60 and the connectors 62, 64 are disconnected from each other.

As shown in FIG. 1, the connector 64 of the PC 12 is connected to the PCI bus 20 of the PC 12, and the connector 62 of the docking station 60 is connected to a PCI bus 68 within the docking station 60 through a PCI-PCI bridge 70. A plurality of IDE devices (e.g., a device conforming to IDE standard such as, for example, a HDD, CD-ROM drive, DVD drive, FDD and the like) can be installed in the docking station 60 and the IDE devices which is installed in the docking station 60 (e.g., two IDE devices 72A and 72B are shown in FIG. 1) are connected to the PCI bus 68 through the PCI/IDE controller 74.

The PCI/IDE controller 74 has PCI interface capability. The PCI/IDE controller 74 allows each IDE device connected to the PCI/IDE controller 74 to act as a PCI device (e.g., a device having PCI interface capability and being connected to the PCI bus).

To configure the computer system 10, many other electric circuits are required in addition to those shown in FIG. 1. However, these circuits are well known to those skilled in the art and do not constitute the essential subject of the present invention, and therefore the description thereof is omitted herein. Also, only part of connections between hardware blocks is shown in the drawings for simplicity.

Operation of the Preferred Embodiment

The operation of the present embodiment will be described below. In this embodiment, a docking station control program for implementing the expansion unit control method according to the present invention is included in a BIOS. Several methods are available for installing the BIOS including the docking station control program in a PC 12.

For example, a setup program for installing the BIOS is stored in a information storage medium 78 (see FIG. 1), such as a floppy disk, along with the BIOS, the information storage medium 78 is inserted into a floppy disk connected to a super I/O controller 46 in the PC 12, and then a direction to execute the setup program is provided to the CPU 14. This causes the BIOS to be read from the information storage medium 78 and the read BIOS to be written into flash ROM 56. Thus, the BIOS is installed.

When the PC 12 is powered on, or when a reboot direction is provided to the PC 12 in an active state, the BIOS installed is activated and executed before an operating system is booted (e.g., the BIOS stored in the flash ROM 56 is read and executed by a CPU 14). When a certain key on a keyboard is depressed to provide a direction to the PC 12 to restore from a suspend mode (resume operation) while the PC 12 is in the suspend mode (e.g., a mode in which all operations (the execution of all tasks) are suspended and accesses to files are restricted in order to save power consumption (e.g., S3 in ACPI)), which is an energy saving mode, an interrupt (e.g., System Management Interrupt: SMI) occurs to execute an SMI handler (e.g., an interrupt management program, which also is part of the BIOS).

The docking station control program is included in the SMI handler, which is executed when a "resume" direction is provided. When the resume direction is provided to execute the SMI handler, the docking station control program included in the BIOS is executed together with the BIOS, thereby causing the PC 12 to act as the computer according to the present invention. Thus, the information storage medium 78 represents the recording medium according to the present invention.

Figure 4:
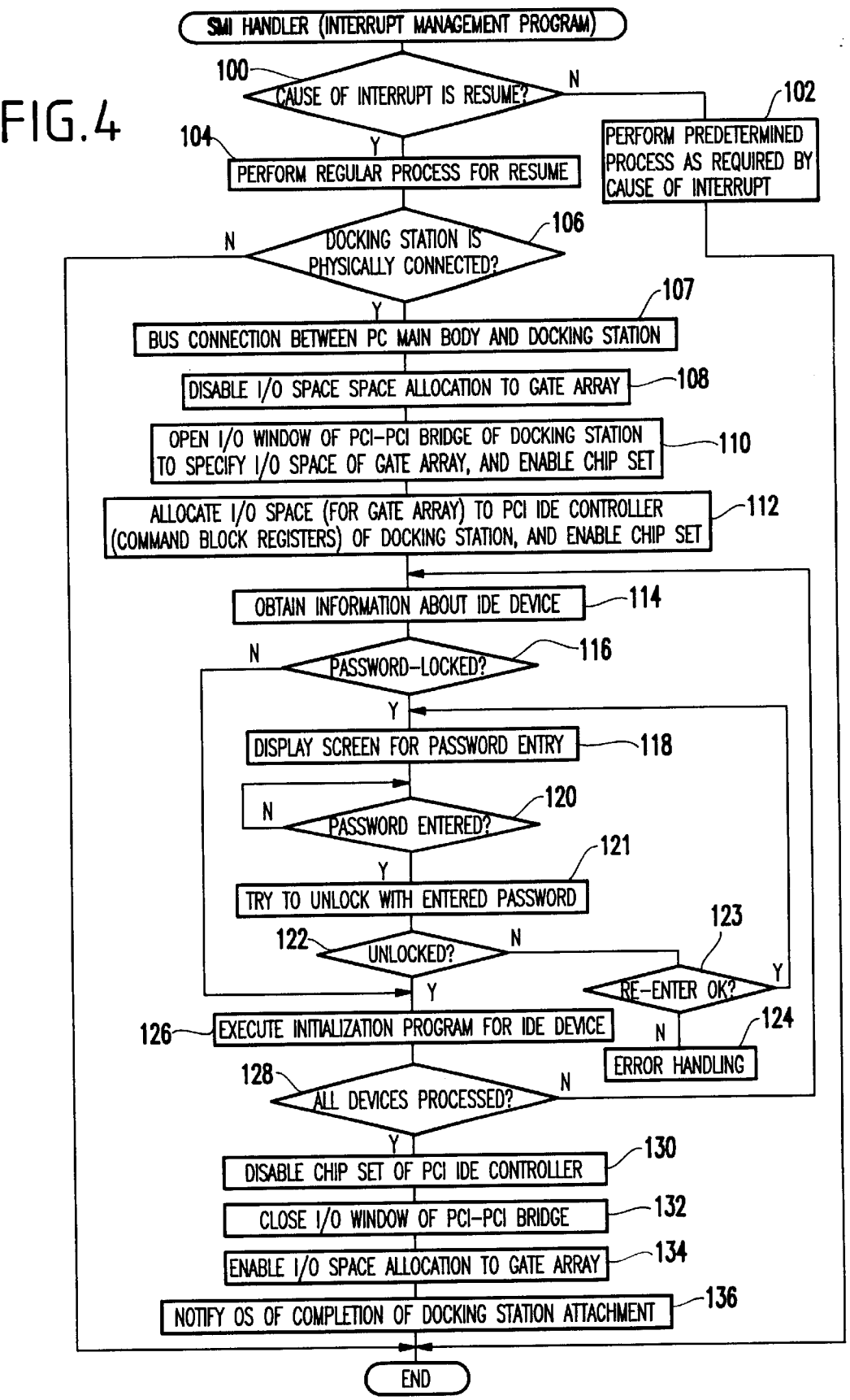
FIG. 4 shows a flowchart of a process implemented by an System Management Interrupt (SMI) handler according to the embodiment of the present invention.

A process implemented by the SMI handler included in the docking station control program will be described below with respect to an example in which a resume direction is provided to the PC 12 after the PC 12 (e.g., the main body of the computer) in suspend mode is attached to a docking station 60 (expansion unit) ("warm-docking"), with reference to a flowchart shown in FIG. 4.

When the SMI handler is activated by the occurrence of an interrupt, first a determination is made as to whether the cause activating the SMI handler (e.g., the cause of the interrupt) is a return from suspend mode (resume) or not at step 100.

If the cause of the activation of the SMI handler is not a resume, then the determination will be negative ("NO"), and the process proceeds to step 102, where a predetermined process (e.g., a process specific to the SMI handler) as required by the cause of the activation (e.g., the cause of the interrupt). If the cause of the interrupt is a resume, then the determination at step 100 will be positive ("YES") and the process proceeds to step 104, which is a regular process (e.g., a process for returning the hardware to its original state preceding the energy saving mode) which the SMI handler should perform during a resume operation.

Then, at step 106, a determination is made as to whether the PC 12 is attached to the docking station 60 and whether the connector 62 is physically connected with the connector 64. When the PC 12 is attached to the docking station 60, a sensor (not shown) provided in the PC 12, detects the attachment. If the PC 12 is in suspend mode, then a gate array 58 coupled with the sensor holds information indicating that the PC 12 and the docking station 60 are physically interconnected. The determination at step 106 is made by accessing the gate array 58 to check whether the information indicating the attachment is held by the gate array 58.

If the information is not held by the gate array 58, then the determination at step 106 will be negative ("NO") and the process will end by passing control to the OS. If the information is held by the gate array 58 and therefore the determination is positive ("YES"), then it can be considered that the PC 12 is attached to the docking station 60 while the PC 12 is in the suspend mode (e.g., see FIG. 5A) (it can be considered that warm-docking is performed), therefore the process at step 108 and the steps thereafter (which are implemented by the docking station control program) are performed.

That is, the PC 12 is electrically connected to the bus of the docking station 60 at step 107. Because the gate array 58 is an ISA device connected to an ISA bus 22, I/O space at a fixed I/O address is allocated to the gate array 58. The I/O space allocation to the gate array 58 is disabled at step 108, to temporarily use the I/O space allocated to the gate array 58 to control devices installed in the docking station 60 (e.g., see FIG. 5B).

Because the ISA bus 22 to which the gate array 58 is connected is connected to a PCI bus 20 through a multifunctional PCI device (PCI-ISA bridge) 38 in the PC 12 according to the present invention, the I/O address assigned to the gate array 58 is set in the multifunctional PCI device 38. When the multifunctional PCI device 38 detects an access request to the gate array 58 on the PCI bus 20, it provides the access request onto the ISA bus 22 to allow for the access to the gate array 58. Therefore, in particular, the process at step 108 is performed by the multifunctional PCI device 38 and thereby disabling the capability of implementing accesses to the gate array 58.

Programs accessing the gate array 58 in this embodiment are a BIOS including the SMI handler and the OS. The SMI handler occupies the CPU 14 until it completes the process shown in FIG. 4. It masks other interrupts and thereby forces the OS programs to wait until the execution of the process shown in FIG. 4 is completed. Therefore, the gate array 58 is not accessed while the process shown in FIG. 4 is performed. Because a PnP BIOS ensures that the I/O space allocated to the gate array 58 is mapped only to the gate array 58 on the OS, the OS does not regard the I/O space allocated to the gate array 58 as unused I/O space and does not allocate such I/O space to another device. Thus, the I/O space allocated to the gate array 58 represents a "predetermined I/O resource that is assured of not being used during the process".

A PCI-PCI bridge of the docking station 60 according to the present embodiment has an I/O window for specifying specific I/O space. If the PCI-PCI bridge detects an access request on the PCI bus (e.g., PCI bus 20) on the primary side and the access request is to I/O space specified in the I/O window, it provides the detected access request onto the PCI bus (e.g., PCI bus 68) on the secondary side.

Figure 5A:
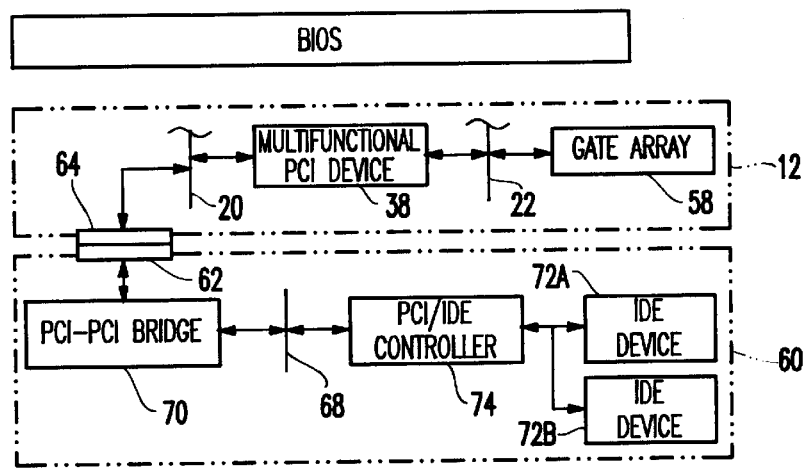
FIGS. 5A to 5C show conceptual diagrams illustrating a process performed by a BIOS (SMI handler) during the warm-docking of the PC 12 with the docking station 60.
Figure 5B:
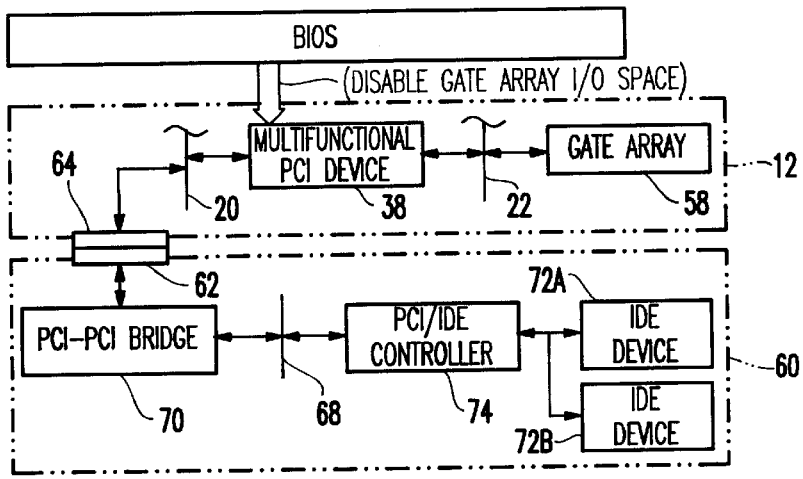
Figure 5C:
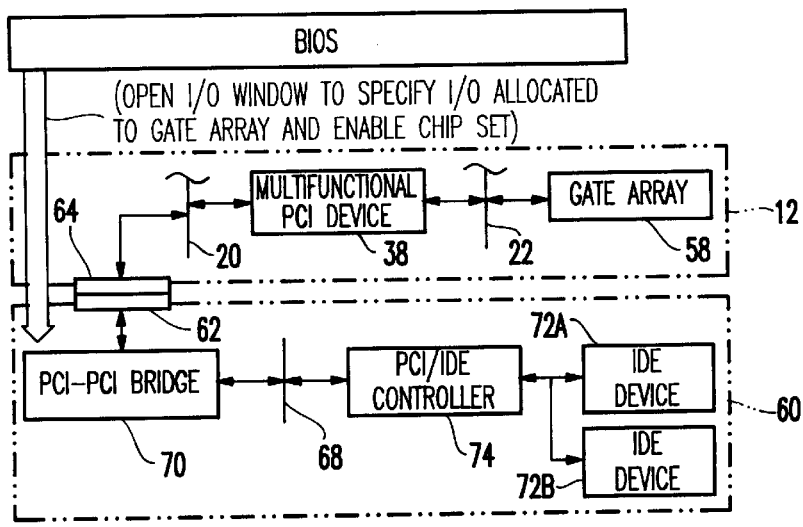

Therefore, at step 110, the I/O window is opened in the PCI-PCI bridge 70 of the docking station 60, the I/O space allocated to the gate array 58 is specified in the I/O window, and a chip set forming the PCI-PCI bridge 70 is enabled (e.g., see FIG. 5C). By doing this, an access request provided through the I/O space allocated to the gate array 58 is provided to the PCI bus 68 on the secondary side through the PCI-PCI bridge 70.

A primary channel and secondary channel are provided in a PCI/IDE controller 74 connected to the PCI bus 68 of the docking station 60 as channels for connecting IDE devices. A group of registers associated with the IDE devices that can be connected to each channel is provided for sending and receiving information relating to the operation of the IDE devices to and from the outside.

At step 112, the I/O space allocated to the gate array 58 is re-allocated to the group of registers provided in the PCI/IDE controller 74. This allows the group of registers in the PCI/IDE controller 74 to be accessed through the PCI-PCI bridge 70 and the PCI bus 68 by accessing the I/O space allocated to the gate array 58. Further, the chip set of the PCI/IDE controller 74 is enabled (e.g., see FIG. 6A). Step 112, together with step 108 described earlier, represent allocation means of the present invention.

Whereas the size of I/O space allocated to the gate array 58 is 8 bytes, the size of the group of registers provided in the PCI/IDE controller 74 for a single channel is 20 bytes. Accordingly, it is impossible to allocate, at once, the I/O space allocated to the gate array 58 to all of the registers provided in the PCI/IDE controller 74 for sending/receiving information.

Therefore, in the present embodiment, the I/O space allocated to the gate array 58 is allocated to a total of 8 bytes of registers (e.g., 1-byte register×8) called "command block registers" for receiving ATA commands in the group of registers provided in the PCI/IDE controller 74, thereby sending and receiving information in Programmed I/O (PIO) mode using the command block registers rather than using a DMA/PCI bus master transfer mode in which information is sent and received by using all of the group of registers.

The command block registers include an 1-byte register (e.g., a status register) in which information indicating the status of an IDE device is stored by the PCI/IDE controller 74. Whether an ATA command sent to the PCI/IDE controller 74 is accepted or not can be determined based on whether the information stored in this status register is changed to information indicating that the IDE device is in a ready status. Thus, even if the size of allocatable I/O space is eight bytes, information can be sent/received using only the eight bytes of command block registers by applying the PIO mode.

Next, at step 114, a predetermined ATA command is sent to the PCI/IDE controller 74 to obtain information about a particular IDE device 72 (IDE device 72 of interest) in the docking station 60 or information indicating whether an access to the IDE device is locked with a password.

In the present embodiment, an access to an HDD among various IDE devices that can be installed in the docking station 60 can be locked by setting a password. Therefore at step 116, a determination is made as to whether an access to the IDE device 72 of interest is locked with a password or not based on the information about the IDE device 72 of interest obtained at step 114.

Figure 6A:
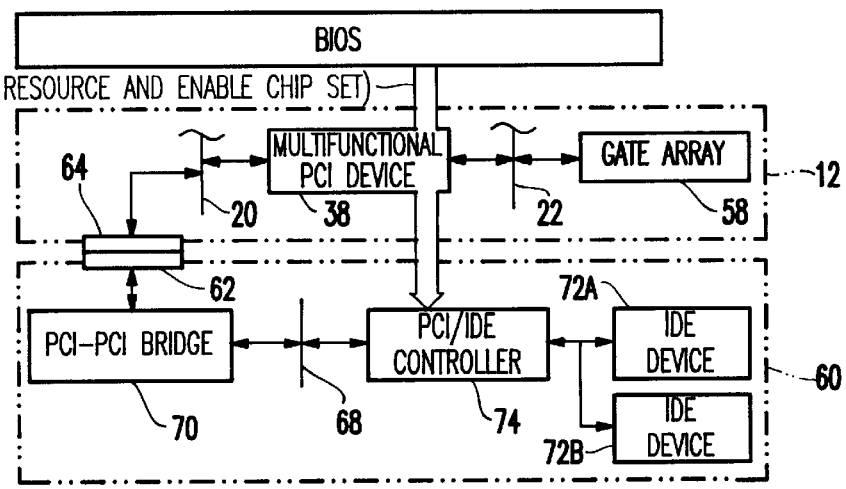
FIGS. 6A to 6C show conceptual diagrams illustrating a process performed by the BIOS (SMI handler) during the warm-docking of the PC 12 with the docking station 60.
Figure 6B:
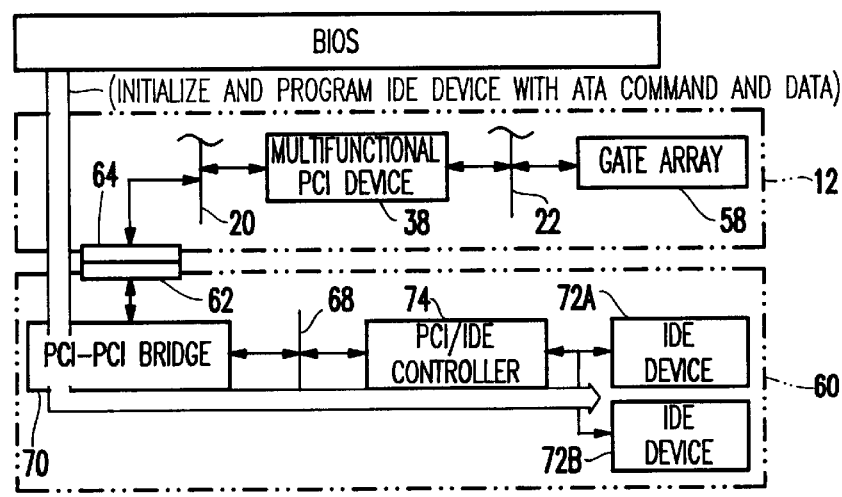
Figure 6C:
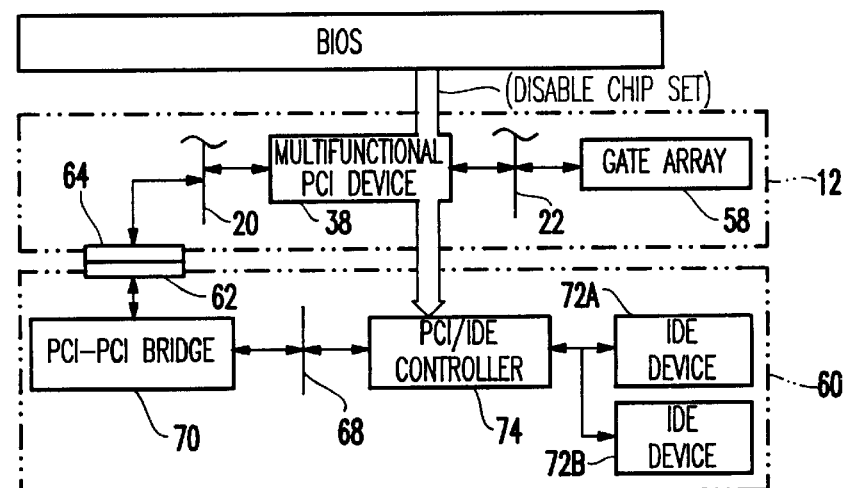
Figure 7A:
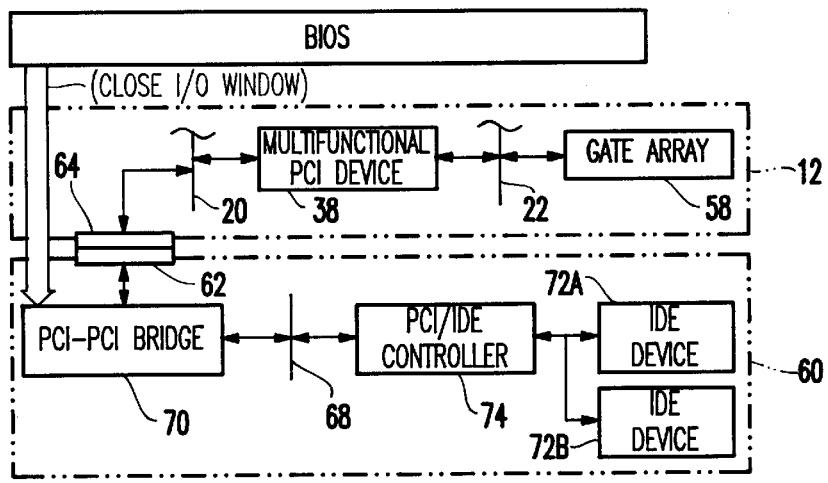
FIGS. 7A to 7C show conceptual diagrams illustrating a process performed by the BIOS (SMI handler) during the warm-docking of the PC 12 with the docking station 60.
Figure 7B:
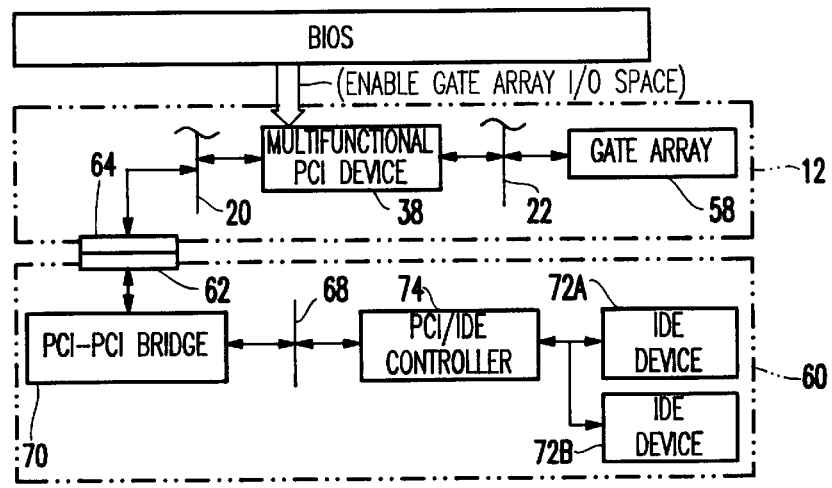
Figure 7C:
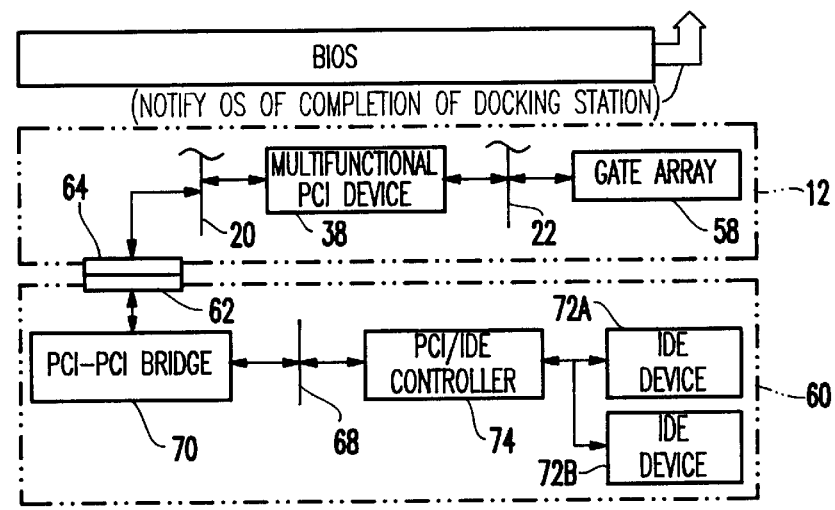

If the IDE device 72 of interest is not an HDD device, or is an HDD an access to which is not locked, the determination at step 116 will be negative and the process proceeds to step 126, where a predetermined ATA command and data are sent to the PCI/IDE controller 74 to perform a predetermined process such as the initialization of the IDE device 72 of interest and programming of a data transfer rate (e.g., see FIG. 6B). If the IDE device 72 of interest is an HDD, a timer value is also programmed for an HDD timer for switching the HDD to a sleep status after the HDD is idle for a certain time period.

On the other hand, if the IDE device 72 of interest is an HDD, an access to which is locked with a password, it is required that the lock be released in order to perform a process such as initialization and programming. Therefore, the determination at step 116 will be positive ("YES") and the process proceeds to step 118, where a screen (e.g., a password prompt) for entering the password set for the IDE device 72 of interest is displayed on a liquid crystal display (LCD) 28 to prompt the user to enter the password.

Then at step 120, a determination is made whether the password is entered by the user and a positive result is awaited. If the password set for the IDE device 72 of interest is entered by the user operating a keyboard, then the determination at step 120 will be positive ("YES") and the process proceeds to step 121, where the input password is sent to the PCI/IDE controller 74 to release the access lock for the IDE device 72 of interest.

At step 122, information about the IDE device 72 of interest is re-obtained to determine whether the access lock of the IDE device 72 of interest is released or not. If the determination at step 122 is negative ("NO"), then the password entered by the user is considered to be invalid and, at step 123, the count value of a retry counter is incremented by one (initial value is zero) and it is judged whether the incremented value exceeds a predetermined value to determine whether the user should be prompted to re-enter a password or not. If the determination at step 123 is positive ("YES"), then the process returns to step 118, where the user is re-prompted to enter a password.

If a correct password is entered by the user, then the access lock of the IDE device 72 of interest is released and the IDE device 72 of interest becomes ready to accept a process such as initialization and programming. Thus, the determination at step 124 will be positive ("YES"), and the process proceeds to step 126, where a predetermined processes such as the initialization of the IDE device 72 of interest and programming of a data transfer rate are performed as mentioned above. Steps 114 to 126 represent processing means of the present invention.

If an incorrect password is repeatedly entered by the user and the count value of the retry counter exceeds the predetermined value, then the determination at step 123 will be negative ("NO") and the process proceeds to step 124, where a predetermined error handling (e.g., to return to suspend mode, or to perform a process to return from suspend mode (resume) without unlocking the IDE device 72 of interest) specified by a specification for the system is performed.

Then, at step 128, a determination is made as to whether the above-described process has been performed for all the IDE devices installed in the docking station 60. If the answer is negative ("NO"), then the process returns to step 114 and the processing at step 114 and the succeeding steps is repeated. If the determination at step 128 becomes positive ("YES"), then the process proceeds to step 130.

At step 130 and beyond, preparation is made for passing control to the OS. That is, the chip set of the PCI/IDE controller 74 is disabled at step 130 (e.g., see FIG. 6C). Then, at step 132, the I/O window of the PCI-PCI bridge 70 is closed (e.g., see FIG. 7A). Then, the I/O space allocation to the gate array 58 is enabled at step 134 (e.g., see FIG. 7B). Thus, if the I/O space allocated to the gate array 58 is accessed, then the gate array 58 will be actually accessed. Steps 130 and 134 represent unlocking means of the present invention.

At step 136, the OS is notified of the completion of the connection with the docking station 60 (e.g., see FIG. 7C), and the process ends by passing the control to the OS. Thus, required processes, including the initialization of the IDE device for the docking station 60, the programming of the data transfer rate or HDD timer and the timer value, and unlocking the HDD locked with a password, are performed. Hence, control is passed to the OS with the PCI bus 20 of the primary side being connected with the PCI bus 68 of the secondary side and the chip set of the PCI/IDE controller 74 of the docking station 60 being disabled.

Figure 8A:
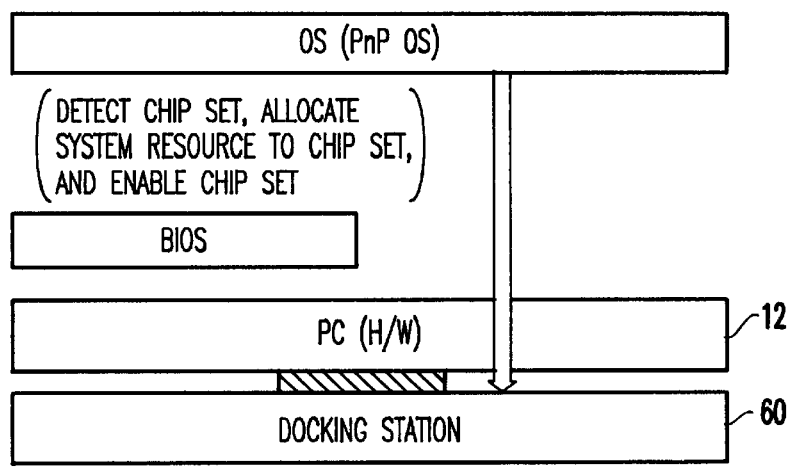
FIGS. 8A to 8C show a process performed by an operating system after the process by the BIOS during the warm-docking of the PC 12 with the docking station 60.
Figure 8B:
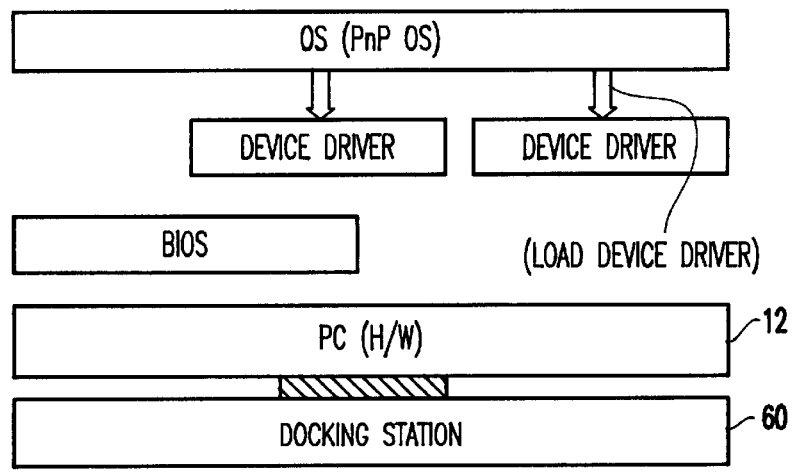

The OS, which is notified of the completion of the connection with the docking station 60 as shown in FIG. 8A, detects the chip set (e.g., the PCI/IDE controller 74) installed in the docking station 60, detects and allocates unused system resources (e.g., such as I/O and memory resources) to the chip set, and enables the chip set. Then, the OS loads a device driver appropriate to the device installed in the docking station 60 in the main memory 16, as shown in FIG. 8B.

Figure 8C:
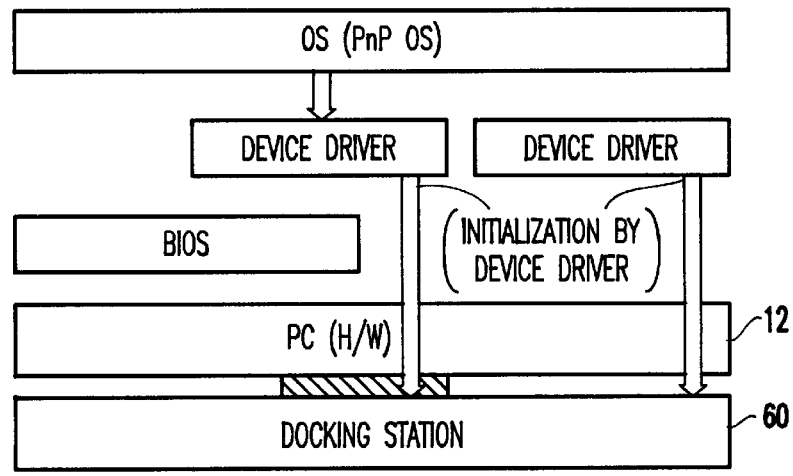

Then, the device driver loaded in the main memory 16 performs an initialization specific to the device driver for the device installed in the docking station 60, as shown in FIG. 8C. The above operation allows the device installed in the docking station 60 to be used in the same manner as devices installed in the PC 12 and various functions to be performed by using the device installed in the docking station 60.

While the embodiment has been described with respect to when the I/O space allocated to the gate array 58 is allocated to the command block registers of the registers provided in the PCI/IDE controller 74 and information is exchanged in Programmed I/O (PIO) mode, the present invention is not limited to this embodiment or application. For example, first the I/O space may be allocated to command block registers in the group of registers provided in the PCI/IDE controller 74 and an ATA command may be sent to the command block registers, then the I/O space may be allocated to a total of four bytes of registers (e.g., 1-byte register×4) for the notification of the status of an IDE device, called control block registers, and other registers of the registers provided in the PCI/IDE controller 74 to determine that the device has received the ATA command. By repeating this process, information can be exchanged in DMA/PCI bus master transfer mode.

While the preferred, non-limiting exemplary embodiment has been described with respect to the warm-docking of the PC 12 with the docking station 60, the present invention of course may be applied to the hot-docking of the PC 12 with the docking station 60. The OS is operating during the hot-docking. However, when the attachment of the PC 12 with the docking station 60 is detected by a sensor, an interrupt (SMI) is caused immediately and an SMI handler (BIOS) is activated. A process as described above may be performed at this point.

While the preferred, exemplary embodiment has been described with respect to when the PC 12 is attached to the docking station 60, the present invention may be applied to the detachment of the PC 12 from the docking station 60 (e.g., undocking). Processing to be performed during the undocking is performed by an OS when the OS is running. The OS may not stop the rotation of the disk of the HDD installed in the docking station 60. Instead, it may disable all chip sets in the docking station 60 to passing control to a BIOS. It is undesirable that the docking station 60 is powered off while the disk of the HDD is rotating because the head of the HDD would come into contact with the disk.

Therefore, preferably if control is passed to the BIOS while the HDD disk of the docking station 60 is rotating and all the chip sets are disabled, I/O space allocated to a gate array 58 is used to enable each chip set, stop the rotation of HDD disk, and then disable each chip set, as described above with respect to the embodiment, to make the docking station 60 ready for power-off. Then it is powered off, thereby avoiding damage to HDD disk during the power-off of the docking station 60 caused by the undocking.

The preferred embodiment has been described with respect to the implementation in which a docking station control program for implementing the expansion unit control method according to the invention is initially stored on the information storage medium 78 as the recording medium according to the present invention, and the program is installed in the PC 12 according to the present invention from the information storage medium and executed to cause the PC 12 to act as a computer according to the present invention.

However, the program may be initially stored in a storage device of another information processing unit (e.g., a network server) connected to the PC 12 through a communication medium (e.g., a fiber-optic or wireless link) in a public phone network or computer network (e.g., a LAN, the Internet, or a wireless communication network), and then the program may be transferred to the PC 12 from the information processing unit over the communication medium (e.g., a transmission medium according to the present invention) by communication between the PC 12 and the information processing unit. Then, the transferred program may be installed in storage means such as a HDD 40 and executed by the PC 12, thus allowing the PC 12 to act as a computer according to the present invention.

As described above, the present invention is highly advantageous in that, when a computer main unit is physically attached to or detached from an expansion unit while an operating system is running on the computer main unit, a predetermined I/O resource ensured not to be used during processing is allocated to a device installed in the expansion unit, information is sent and received through the I/O resource to perform the predetermined process, and then the I/O resource allocated to the device is deallocated, thereby allowing the predetermined process to be easily performed for the expansion unit that is attached to the computer main unit, or to be detached from the computer main unit while an operating system is running on the computer main unit.

While the invention has been described in terms of a preferred embodiment, those skilled in the art will recognize that the invention can be practiced with modification within the spirit and scope of the appended claims.

Having thus described our invention, what we clam as new and desire to secure by Letters Patent is as follow:

1. An expansion unit set-up control method for use with an expansion control unit containing at least one device, said method comprising:

allocating a predetermined input/output (I/O) resource, ensured not to be currently used in processing, to said at least one device as an I/O resource used for sending and receiving information;

performing a predetermined set-up process for said at least one device by sending and receiving information to and from said at least one device through said predetermined I/O resource; and deallocating said predetermined I/O resource allocated to said at least one device upon having completed a set-up of each of said at least one device contained in said expansion control unit.

2. The method of claim 1, further comprising:

one of detecting that a computer main unit is physically attached to the expansion unit, and notifying that the computer main unit is to be detached from the expansion unit while an operating system is running on the computer main unit to which the expansion unit containing said at least one device can be attached.

3. The expansion unit control method according to claim 2, wherein said predetermined I/O resource comprises I/O space allocated to a device which is connected to an Industry Standard Architecture (ISA) bus of said computer main unit and is specific to said computer main unit.

4. The expansion unit control method according to claim 2, wherein said predetermined process comprises:

if a device, the use of which is locked by a password, is installed in said expansion unit physically attached to said computer main unit, releasing said lock by sending the password to said device.

5. The expansion unit control method according to claim 4, wherein the password for releasing said lock is obtained by prompting a user to enter the password.

6. The expansion unit control method according to claim 2, wherein said device comprises an Integrated Drive Electronics (IDE) device and said predetermined process is performed by using an AT Attachment (ATA) command.

7. The expansion unit control method according to claim 6, wherein, if a size of the I/O space as said predetermined I/O resource is smaller than a size of a group of registers provided in said expansion unit correspondingly to said device for sending and receiving information, said method further comprising one of:

allocating said I/O space to a command accepting register in said group of registers to perform said predetermined process in programmed input/output (PIO) mode; and allocating said I/O space to the command accepting register in said group of registers and sending an ATA command to the command accepting register, allocating said I/O space to a status notification register of said device in said group of registers, and determining that said device received the ATA command to perform said predetermined process.

8. The expansion unit control method of claim 2, wherein said predetermined process comprises at least one of:

programming a data transfer rate;

programming a timer value for switching a device to a sleep status after the device is idle for a predetermined period; and deactivating a device installed in the expansion unit to be detached from the computer main unit.

9. A computer, comprising:

an allocation unit for allocating, during a set-up process of a device attached to an expansion unit, a predetermined I/O resource ensured not to be currently used in processing to a device as an I/O resource used for sending and receiving information when it is detected that a computer main unit is physically attached to an expansion unit, or it is notified that the computer main unit is to be detached from the expansion unit, while an operating system is running on the computer main unit to which the expansion unit containing at least one device can be attached;

a processing unit for performing a predetermined set-up process for said at least one device by sending and receiving information to and from said at least one device through said predetermined I/O resource; and a deallocation unit for deallocating, upon completing a set-up of said at least one device, said predetermined I/O resource allocated to said at least one device.

10. The system according to claim 9, wherein said predetermined I/O resource comprises I/O space allocated to a device which is connected to an Industry Standard Architecture (ISA) bus of said computer main unit and is specific to said computer main unit.

11. The system according to claim 9, further comprising:

a lock-release module for releasing said lock by sending a password to a device if said device, the use of which is locked by the password, is installed in said expansion unit physically attached to said computer main unit.

12. The system according to claim 9, wherein the password for releasing said lock is obtained by prompting a user to enter the password.

13. The system according to claim 9, wherein said at least one device comprises an Integrated Drive Electronics (IDE) device and said predetermined process comprises using an AT Attachment (ATA) command.

14. The system according to claim 13, further comprising:

a comparator for determining whether a size of the I/O space as said predetermined I/O resource is smaller than a size of a group of registers provided in said expansion unit correspondingly to said device for sending and receiving information; and an allocator for one of:
- allocating said I/O space to a command accepting register in said group of registers to perform said predetermined process in programmed input/output (PIO) mode; and
- allocating said I/O space to the command accepting register in said group of registers and sending an ATA command to the command accepting register, allocating said I/O space to a status notification register of said device in said group of registers and determining that said device received the ATA command to perform said predetermined process.

15. The system of claim 9, wherein said predetermined process comprises at least one of:
- programming a data transfer rate;
- programming a timer value for switching a device to a sleep status after the device is idle for a predetermined period; and
- deactivating a device installed in the expansion unit to be detached from the computer main unit.

16. A recording medium containing a program for causing a computer to perform a set-up process when it is detected that a computer main unit is physically attached to an expansion unit or it is notified that the computer main unit is to be detached from the expansion unit while an operating system is running on the computer main unit to which the expansion unit containing at least one device can be attached, said set-up process comprising:
- allocating a predetermined input/output (I/O) resource, ensured not to be currently used in processing, to said at least one device as an I/O resource used for sending and receiving information during said set-up process;
- performing a predetermined set-up process for said at least one device by sending and receiving information to and from said at least one device through said predetermined I/O resource; and
- deallocating said predetermined I/O resource allocated to said at least one device when a set-up has been completed.

17. The recording medium according to claim 16, wherein said predetermined I/O resource comprises I/O space allocated to a device which is connected to an Industry Standard Architecture (ISA) bus of said computer main unit and is specific to said computer main unit.

18. The method recording medium to claim 16, wherein said predetermined set-up process comprises:
- if a device, the use of which is locked by a password, is installed in said expansion unit physically attached to said computer main unit, releasing said lock by sending the password to said device.

19. The recording medium according to claim 18, wherein the password for releasing said lock is obtained by prompting a user to enter the password.

20. The recording medium according to claim 16, wherein said device comprises an Integrated Drive Electronics (IDE) device and said predetermined set-up process comprises using an AT Attachment (ATA) command.

21. The recording medium according to claim 20, wherein, if a size of the I/O space as said predetermined I/O resource is smaller than a size of a group of registers provided in said expansion unit correspondingly to said device for sending and receiving information, said method comprises further one of:
- allocating said I/O space to a command accepting register in said group of registers to perform said predetermined process in programmed input/output (PIO) mode; and
- allocating said I/O space to the command accepting register in said group of registers and sending an ATA command to the command accepting register, allocating said I/O space to a status notification register of said device in said group of registers, and determining that said device received the ATA command to perform said predetermined process.

22. A transmission medium for transmitting a program to cause a computer to perform a set-up process when it is detected that a computer main unit is physically attached to an expansion unit or it is notified that the computer main unit is to be detached from the expansion unit, while an operating system is running on the computer main unit to which the expansion unit containing at least one device can be attached, said process comprising:
- allocating a predetermined I/O resource, ensured not to be currently used in processing, to said at least one device as an I/O resource used for sending and receiving information during execution of said set-up process;
- performing a predetermined set-up process for said at least one device by sending and receiving information to and from said at least one device through said predetermined I/O resource; and
- deallocating said predetermined I/O resource allocated to said at least one device upon a completion of a set-up.

23. The transmission medium according to claim 22, wherein said predetermined I/O resource comprises I/O space allocated to a device which is connected to an Industry Standard Architecture (ISA) bus of said computer main unit and is specific to said computer main unit.

24. The transmission medium according to claim 22, wherein said predetermined set-up process comprises:
- if a device, the use of which is locked by a password, is installed in said expansion unit physically attached to said computer main unit, releasing said lock by sending the password to said device.

25. The transmission medium according to claim 24, wherein the password for releasing said lock is obtained by prompting a user to enter the password.

26. The transmission medium according to claim 22, wherein said device comprises an Integrated Drive Electronics (IDE) device and said predetermined process comprises using an AT Attachment (ATA) command.

27. The transmission medium according to claim 26, wherein, if a size of the I/O space as said predetermined I/O resource is smaller than a size of a group of registers provided in said expansion unit correspondingly to said device for sending and receiving information, said method further comprises one of:
- allocating said I/O space to a command accepting register in said group of registers to perform said predetermined process in programmed input/output (PIO) mode; and
- allocating said I/O space to the command accepting register in said group of registers and sending an ATA command to the command accepting register, allocating said I/O space to a status notification register of said device in said group of registers, and determining that said device received the ATA command to perform said predetermined process.

28. A method of attaching a computer with a docking station, said method comprising:
- performing a predetermined set-up process for an expansion unit attached to a personal computer (PC) while an operating system is running on the PC;

when an attachment of the PC with an docking station is detected and a BIOS is activated, disabling an I/O space allocation to a gate array connected to an ISA bus, the I/O space being specified in the I/O window of a PCI-PCI bridge in the docking station, and the I/O space being allocated to a command block register of a PCI IDE controller;

sending an ATA command to the register to perform a set-up process including any of a process for initializing a device installed in the docking station, programming a data transfer rate, and clearing a password, such that the I/O space allocation is deallocated; and notifying an operating system of completion of the attachment of the PC with the docking station, thereby completing a set-up.

29. A method for controlling an expansion unit, said method comprising:

when a computer main unit is physically attached to or detached from an expansion unit while an operating system is running on the computer main unit, allocating a predetermined I/O resource, ensured not to be used during current processing, to a device installed in the expansion unit;

sending and receiving information through the I/O resource to perform a predetermined set-up process, and deallocating the I/O resource allocated to the device upon a completion of a set-up, thereby allowing the predetermined set-up process to be performed for the expansion unit that is attached to the computer main unit, or to be detached from the computer main unit while an operating system is running on the computer main unit.

* * * * *